(No Model.)
C. H. PEARDON.
SULKY.
No. 579,176. Patented Mar. 23, 1897.
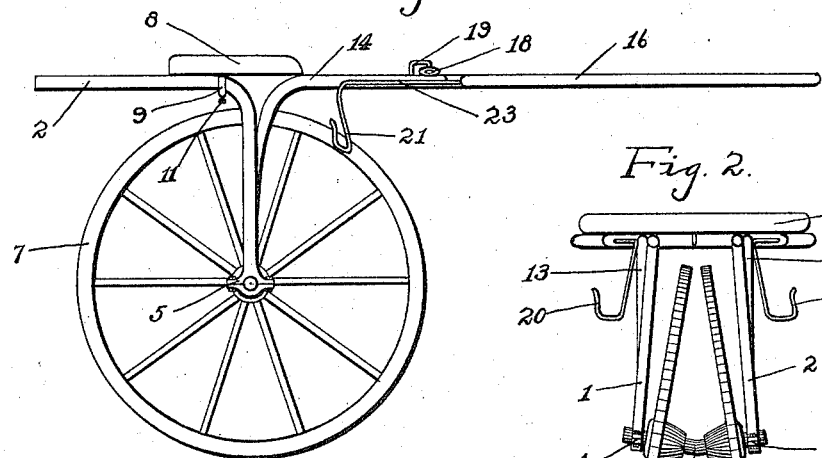
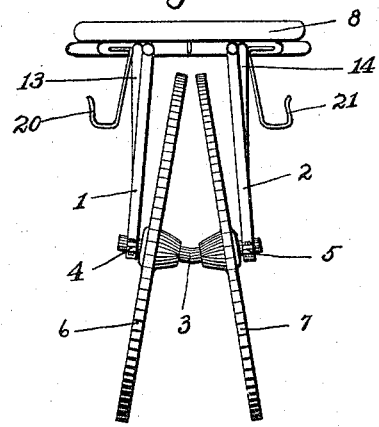
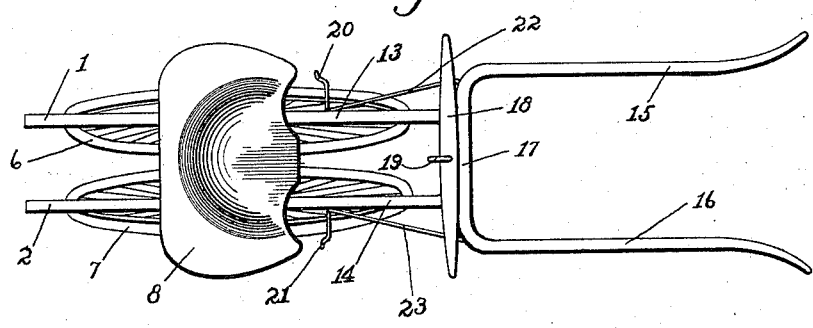
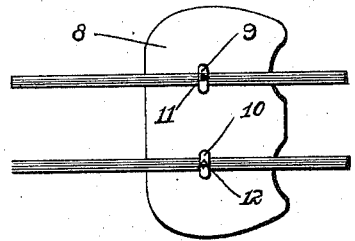
WITNESSES
F. B. Burry.
J. C. Tappan
INVENTOR
Charles H. Peardon,
by John Wedderburn
Attorney

UNITED STATES PATENT OFFICE.

CHARLES H. PEARDON, OF PALMYRA, WISCONSIN.

SULKY.

SPECIFICATION forming part of Letters Patent No. 579,176, dated March 23, 1897.

Application filed August 21, 1896. Serial No. 603,520. (No model.)

*To all whom it may concern:*

Be it known that I, CHARLES H. PEARDON, a citizen of the United States, residing at Palmyra, in the county of Jefferson and State of Wisconsin, have invented certain new and useful Improvements in Sulkies; and I do hereby declare the following to be a full, clear, and exact description of the invention, such as will enable others skilled in the art to which it appertains to make and use the same.

My invention relates to sulkies.

My object is to provide a sulky which cannot be easily overturned and which will run close to the horse, but in no manner interfere with the latter.

Having this object in view, my invention consists of a sulky having wheels arranged in a novel manner, so that a broad support is afforded, and which allows the feet of the horse to be received between them, so that the sulky is adapted to run close to the animal.

The invention further consists of certain details of construction and novel combinations of parts appearing more fully hereinafter.

In the accompanying drawings, Figure 1 is a view in side elevation of my improved sulky; Fig. 2, a rear view; Fig. 3, a plan view; Fig. 4, a detail view of the bottom of the seat and the guide-rods on which the same is slidable, and Fig. 5 a detail of the axle.

The numerals 1 and 2 designate the members of the rear portion of the frame of the vehicle, and said members are duplicates, each comprising a horizontally-extending portion and a downwardly-extending portion, the downwardly-extending portions diverging, being located closer together at their upper ends.

The numeral 3 designates my improved axle or shaft, which is made in the shape of a V that has its apex pointing downwardly. The ends of this axle are securely held in respective boxes 4 and 5, connected to the upright portions of the members of the rear part of the frame.

The wheels are designated by the numerals 6 and 7, said wheels being journaled on the parts of the V-shaped axle, and hence it will be seen that the tops of said wheels lie very close together, but the bottoms thereof are separated a considerable distance, so that a broad tread is obtained.

A seat which may be constructed in any preferred manner is designated by the numeral 8, and eyes 9 and 10 are secured to this seat, being slidable on the horizontally-extending members 1 and 2. Clamping-screws 11 and 12 serve to hold the seat at any point after adjustment along said members.

At 13 and 14 are shown the members of the front portion of the frame, said members being bent downwardly at their rear ends and connected to the vertical portions of the rear members of the frame. The thills or shafts are shown at 15 and 16, being connected by a cross-piece 17, and the front ends of the front members of the frame are secured to said cross-piece.

The numeral 18 designates a singletree which is pivoted on a bracket 19, secured to the cross-piece of the thills.

There are two foot-rests 20 and 21, which are secured to the horizontal portions of the front members of the frame and then extend forwardly, as shown at 22 and 23, and are secured to the cross-piece that connects the thills.

Owing to the peculiar construction of the axle and the disposition of the wheels thereon, a broad tread is afforded and yet the sulky can be located close to the horse, as there is ample space for the feet of the latter between the wheels. Furthermore, the seat can be adjusted as desirable, and the whole sulky is simple, light, and strong.

There are many slight and immaterial changes of construction which might be resorted to without detracting from any of the advantages of my invention, and it is to be understood, therefore, that I do not limit myself to the precise construction herein shown and described, but consider that I am entitled to all such variations as come within the spirit and scope of the invention.

Having thus described my invention, what I claim as new, and desire to secure by Letters Patent, is—

1. In a sulky, the combination with a sulky-frame, of a V-shaped axle made in a single piece and having its point or apex pointing downwardly, said axle having its ends connected to the frame, and traction-wheels journaled on the inclined portions of the axle.

2. In a sulky, the combination with independent members having downwardly-extending portions and horizontally-extending upper portions, of a seat, eyes carried by said seat which receive and are slidable on the horizontally-extending portions of the members, clamping-screws for the eyes, thills connected to the members, and traction-wheels.

In testimony whereof I have signed this specification in the presence of two subscribing witnesses.

CHARLES H. PEARDON.

Witnesses:
ANDREW ROOD,
J. L. SUTHERLAND.